United States Patent [19]

Sensi

[11] 4,322,236
[45] Mar. 30, 1982

[54] FLOAT GLASS FORMING CHAMBER HAVING LOW PROFILE ROOF

[75] Inventor: John E. Sensi, Arnold, Pa.

[73] Assignee: PPG Industries, Inc., Pittsburgh, Pa.

[21] Appl. No.: 209,636

[22] Filed: Nov. 24, 1980

[51] Int. Cl.³ ............................................. C03B 18/16
[52] U.S. Cl. .................................. 65/182.5; 65/182.3; 65/346
[58] Field of Search ................. 65/182.1, 182.3, 182.4, 65/182.5, 346

[56] References Cited

U.S. PATENT DOCUMENTS 3,486,876 12/1969 Augustin et al. ............... 65/182.1 X
3,584,477 6/1971 Hainsfurther ...................... 65/182.1
3,669,640 6/1972 Brichard et al. .................. 65/182.5
3,976,460 8/1976 Kompare et al. ............. 65/182.1 X Primary Examiner—Arthur D. Kellogg
Attorney, Agent, or Firm—Dennis G. Millman

[57] ABSTRACT

A float glass forming chamber with electrical heating means is provided with a plurality of compact housings to enclose electrical connections, thereby avoiding the conventional overhead plenum chamber. Also, a gastight casing directly overlying the roof elements serves to minimize the volume of the overhead structure. Both features reduce condensation and drippage of volatile materials within the chamber and improve access to forming chamber elements.

12 Claims, 6 Drawing Figures

FLOAT GLASS FORMING CHAMBER HAVING LOW PROFILE ROOF

BACKGROUND OF THE INVENTION

In the float process for forming flat glass, molten glass is drawn from a melting furnace and passed to a forming chamber (or "float bath") where the molten glass is deposited onto an elongated pool of molten metal such as tin or copper or alloy thereof. There, a ribbon of glass is stretched to the desired thickness as it progresses along the elongated pool of molten metal and is then withdrawn from the forming chamber as a continuous ribbon at the exit end of the forming chamber. Because of the fluid support provided by the molten metal to the glass, glass of superior optical quality can be produced by the float process.

Unfortunately, a float glass forming chamber is not free from distortion producing effects. One such effect is the "drip" problem which is caused by dripping of molten droplets of metal or compounds thereof from the roof of the forming chamber onto the glass ribbon. Although the atmosphere within the float forming chamber is usually positively pressurized with an inert or reducing gas atmosphere, sulfur and oxygen are introduced into the chamber from the glass ribbon and from other sources, and these combine with the metal of the molten metal bath to form sulfides and oxides (e.g., tin sulfide and tin oxide) which volatilize and condense on relatively cool portions of the interior surface of the float chamber. The condensate accumulates on the structural members of the bath interior, and under certain temperature and chemical conditions will be reduced to elemental metal (e.g., tin), which eventually falls as droplets onto the glass ribbon. The impact of the metallic droplets on the soft glass ribbon produces indentations which appear as optical distortions in the final glass product. This defect is known variously as "tin drip," "crater drip," "top drip," or "tin speck."

Prior art float glass forming chambers conventionally include a large number of electrical resistance heating elements for controlling the heat within the chamber, and which extend vertically through the roof of the chamber. Electrical connections are made to the heating elements above the roof by means of a complex arrangement of bus bars and leads. Because of the hot environment it has been considered desirable to retard oxidation of the connecting means by enclosing the connection means within a large, gas-tight enclosure above the roof, known as the upper plenum, and by providing the upper plenum with a non-oxidizing atmosphere. This non-oxidizing atmosphere is generally the same as the inert or reducing atmosphere maintained in the forming chamber itself, and therefore, it is customary to continuously supply the atmosphere to the forming chamber by way of the upper plenum, whereby the incoming atmosphere tends to preserve the electrical connections by cooling them as well as chemically inhibiting their oxidation. The atmosphere passes from the plenum into the forming chamber through joints around the heating elements as well as through other joints and crevices in the roof structure. It is now believed that this practice of passing the relatively cool incoming atmosphere through the roof joints aggravates the drippage problem, and therefore it is an object of the present invention to avoid this practice.

Another drawback of the prior art use of a large upper plenum to enclose the electrical connection means is that the electrical heating elements and associated hardware are rendered nearly inaccessible. As a result, it is extremely difficult to perform maintenance or to modify the heating arrangement while the float chamber is operating.

SUMMARY OF THE INVENTION

In the present invention, the electrical connections to the heating elements of a float glass forming chamber are enclosed in small, compact enclosures, each of which may accommodate a small group of heating elements, preferably a single heating element. Preferably, bus bars are provided exterior to the housings. The housings serve to seal the forming chamber against the escape of its inert or reducing atmosphere around the legs of the heating elements, but since the housings are of a size that permits cooling of the connections by external circulation of surrounding air around the housings, there is no need to pass the incoming atmosphere through the housings. The potential for inducing drippage of condensed materials from the roof of the chamber is thereby reduced.

Additionally, the compact housings permit ready access to each heating element and its connections during operation. As a result, damaged heating elements may be replaced, or the heating pattern may be altered with relative ease. Furthermore, elimination of the conventional large plenum and the use of the separate housings of the present invention results in a more compact float bath structure that may be accompanied by economies of construction and operation.

Another aspect of the present invention involves a gas-tight casing around the roof structure closely adjacent to, preferably in contact with, the refractory material of the roof. By thus providing essentially no space between the casing and the roof, a location for the collection of volatilized substances is reduced or eliminated. Access to the roof for repairs or modifications is improved as well.

THE DRAWINGS

FIG. 4 is a plan view of a portion of the roof exterior taken along line 4—4 in FIG. 1a.

DETAILED DESCRIPTION

A specific embodiment of the present invention will be disclosed in conjunction with a particular slab roof construction for a float forming chamber which constitutes the subject matter of co-pending U.S. Patent Application Ser. No. 210,658 filed on Nov. 26, 1980, by John E. Sensi and entitled "Float Glass Forming Chamber with Slab Roof." It should be apparent that the concept of modular electrical connection housings of the present invention is not limited to any particular roof structure, and may be employed with the prior art roof structure described herein.

Figure 1:
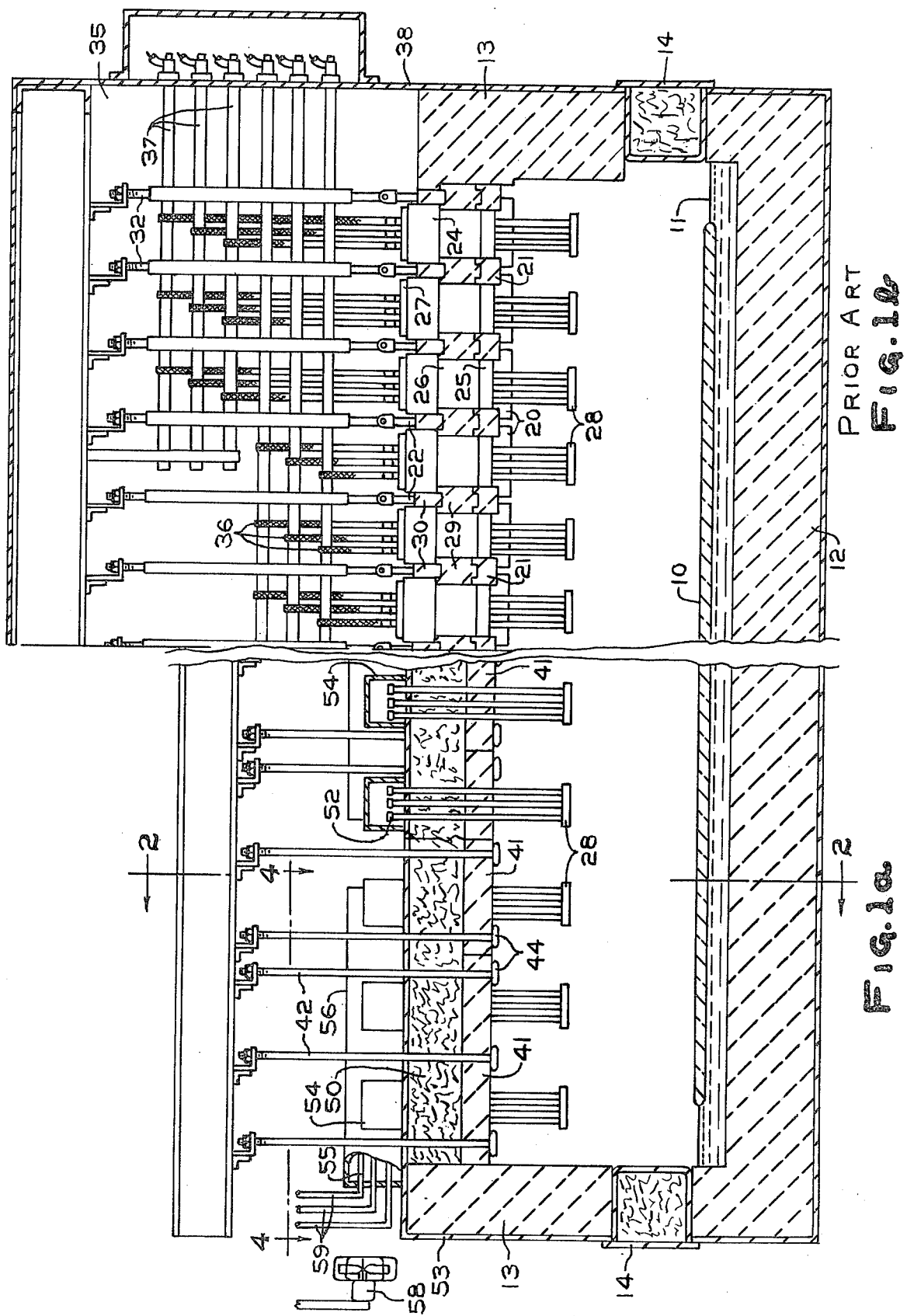
FIG. 1a is a transverse cross-sectional view of a preferred embodiment of a float glass forming chamber in accordance with the present invention.
FIG. 1b is a transverse cross-sectional view of a conventional prior art float glass forming chamber shown for comparison.

In FIG. 1a and FIG. 1b there is shown, side-by-side for comparison, float bath roof designs in accordance with a preferred embodiment of the present invention (FIG. 1a) and the conventional prior art float bath roof (FIG. 1b). In both, a ribbon of glass 10 being attenuated to the desired thickness floats on a pool of molten metal 11 (usually tin, although copper or mixtures of tin and copper may also be employed). Minor amounts of other metals such as iron may also be included in the molten metal bath. The metal bath is contained within a refractory vessel comprising a bottom 12 and side walls 13 having access openings that may be closed by means of side seals 14.

In the prior art roof arrangements as shown in FIG. 1b, the basic support grid comprises a large number of transversely extending support members 20 and longitudinally extending support members 21, both of which are preformed ceramic pieces. Vertically extending hanger rods 22 have hook-like members at their lower ends (not shown) which engage and interlock the ends of adjacent transverse support members 20. The longitudinal support members 21 span adjacent rows of the transverse support members 20 upon which they rest at opposite ends. The hanger rods 22 are, in turn, support from above by rods 32 fastened at their upper ends to the overhead superstructure. The spacing between adjacent hanger rods both transversely and longitudinally in such a system is typically on the order of 30 centimeters or less. Into the rectangular openings in this grid are inserted a large number of heater elements, each of which consists of a sandwich of a plurality of pieces of refractory material 24, 25, 26, and 27 fastened together by means of vertically extending tie rods (not shown) and a vertically extending, three-legged, electrical resistance heating element 28 passing through the refractory pieces. The bottom refractory member 25 of the composite heating element overlaps and rests upon adjacent transverse support members 20. The spaces between the heating elements are filled with additional refractory members 29 and 30 which rest on the longitudinal support members 21 between the hangers 22. Heater elements are shown inserted into each of the grid openings in FIG. 1b as is the case in some zones of a conventional float chamber, but in other zones a particular cross-section may have some or even all of the openings filled with blind plugs rather than heater elements.

The prior art arrangement as shown in FIG. 1b employs a relatively large upper plenum chamber 35 to accommodate electrical connections to the heater elements. Each leg of the resistance heater elements 28 is connected at its upper end to a lead 36 which is, in turn, connected to a bus bar 37 in a three phase alternating current system. Because the float chamber is usually provided with an inert or reducing gas atmosphere, the entire chamber, including the upper plenum, is enclosed in a metal casing 38 to make the structure essentially gas-tight. To prevent oxidation of and to cool the electrical connections within the upper plenum 35, the inert or reducing gas atmosphere is usually fed to the upper plenum 35 from which it passes into the main forming chamber through joints in the roof structure.

Figure 2:
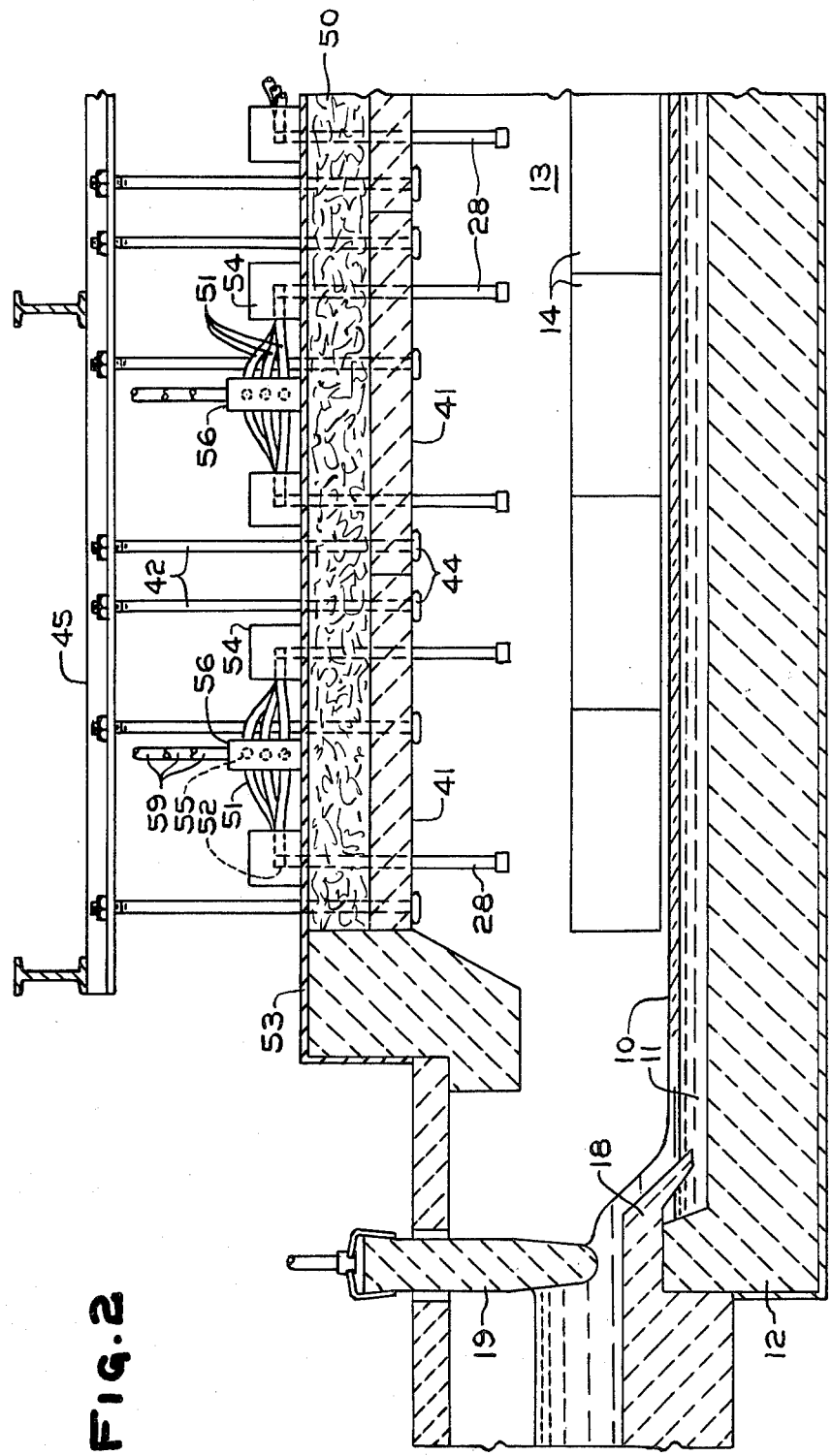
FIG. 2 is a longitudinal cross-section taken along line 2—2 in FIG. 1a of a preferred embodiment of a float glass forming chamber in accordance with the present invention.
Figure 3:
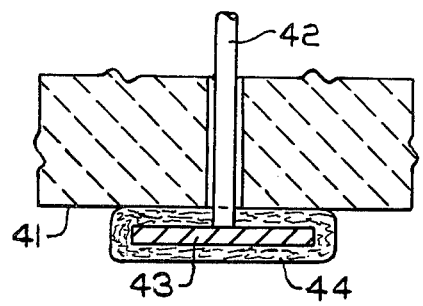
FIG. 3 is an enlarged cross-sectional view of a portion of a roof slab of a preferred embodiment, showing details of a preferred hanger arrangement.
Figure 4:
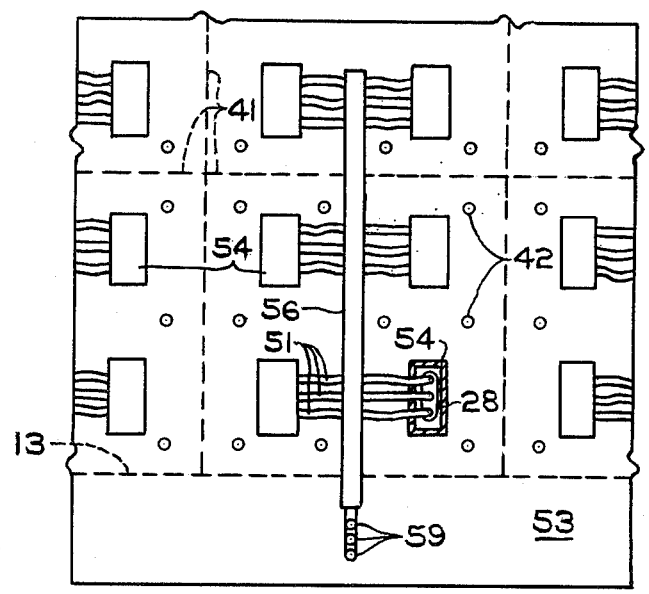

A preferred embodiment of the float chamber roof of the present invention may be seen in FIG. 1a and FIG. 2. Also, in FIG. 2 there may be seen a typical inlet to a float chamber where molten glass is delivered between a threshold 18 and a metering gate or "tweel" 19 onto the molten metal 11 of the float forming chamber. A novel aspect of the depicted embodiment includes a roof structure in the form of a plurality of flat slabs 41 presenting an essentially horizontal, planar bottom surface to the interior of the float chamber. Such a slab may comprise a joint-free section of the roof much larger than those in a conventional float chamber roof. A slab 41 typically may have at least one horizontal dimension on the order of about one half meter or more, preferably about one meter. A horizontal area of at least about one half square meter, preferably at least one square meter, is typical. The actual size of a slab will depend upon the particular refractory being used, the geometry and thickness of the slab, and the operating conditions to which the slab will be exposed. While the maximum benefit would appear to be attained from the use of the maximum sized slab throughout the float chamber, the float chamber roof advantages may be obtained by employing the roof structure of the present invention in only portions of a float chamber, particularly in areas where drippage may be concentrated. Furthermore, constructional expediencies may require that slabs of less than the maximum area be employed in portions of the roof. Although rectangular slabs are shown in the drawings, it should be apparent that the slabs could have any shape in order to conform to any irregularities of the forming chamber structure or to accommodate any ancillary equipment.

The roof slabs 41 may be supported from above by any suitable hanger arrangement. In the depicted embodiment, each slab is supported by a plurality of vertically extending rods 42, each of which extends through the slab and is affixed at its lower end to a horizontal plate 43 on which the weight of the slab rests. The plate 43 may be covered with a layer of refractory material 44 to protect the plate from the high temperature environment in the interior of the float chamber. The refractory layer 44 may, for example, be a wrapping of alumina-silica fiber paper such as that sold under the name "Fiberfrax" by Carborundum Company, Niagara Falls, N.Y. A layer of the same type of refractory paper may be inserted between the slabs 41 to help seal the joints therebetween. The rods 42 and plates 43 are preferably made of stainless steel due to the high temperature environment. Each of the rods 42 is affixed at its upper end to a suitable overhead structural member 45.

The insulating value of the roof may be increased by applying a layer of insulating material 50 over the refractory slabs 41. This insulating material is preferably a loose material which may be packed around the rods 42 and heating elements 28 which extend through the roof slabs 41. A suitable material is "Fiberfrax" tamping mix sold by Carborundum Company, Niagara Falls, N.Y., and which is comprised of high temperature mineral wool. The insulating layer 50 also serves to plug the joints around the refractory slabs 41. By selecting the thickness of the insulating layer, the heat flux through the roof may be established, and by employing different thicknesses in different areas some control over the cooling pattern of the glass ribbon can be achieved. Furthermore, when the insulation is a loose material, altering the heat flux pattern of the roof is made relative simple by adding or removing some of the insulation. The use of a loose insulation material is also advantageous because of its flexibility which avoids the danger of cracking during heat-up and any gaps which may open can be filled easily with additional insulation. Additionally, because the loose insulation can be removed easily, removing or inserting heating elements, cooler, or measuring devices is expedited.

The heating elements 28 employed in connection with the present invention may be the same three-legged, three phase electric resistance heaters employed in conventional float chambers. The heating elements 28 may extend vertically through holes bored through or cast into the refractory slabs 41 and may extend above the roof structure where they may be attached to electrical leads 51 by means of clamps 52.

A preferred mode of the module electrical connection housings of the present invention is depicted in FIG. 1a. There, it may be seen that the large plenum space 35 above the roof and the complex arrangement of bus bars in the prior art arrangement have been eliminated. In the preferred embodiment, the float chamber is maintained gas-tight by a metal casing 53 which extends across the chamber roof with essentially no space between the casing and the refractory material of the roof. Alternatively, the gas-tight casing may comprise a glaze applied to the surface of the insulating layer 50. Sodium silicate ("water glass") forms a suitable glaze when applied as a liquid to the surface. The use of a glaze further increases the adaptability of the roof structure since modifications to the heating elements or instrumentation can be carried out by merely breaking an area of the glaze, and then reglazing the area after the modification has been completed.

The legs of the heating elements 28 extend through the casing 53 and the upper ends are enclosed by individual gas-tight housings 54. The housings 54 serve to contain within the forming chamber the inert or reducing gas atmosphere that may escape along the legs of the heating elements. Electrical conductor leads 51 are connected at one end to the upper ends of the heating element legs by means of clamps 52, and at the opposite ends to bus bars 55. The bus bars 55 are preferably located outside the housings 54 to permit the housings to be compact. Separate enclosures 56 may be provided for the bus bars, if desired, primarily for the sake of safety. Heavy cables 59 extend from the bus bar enclosures 56 to a main power source.

A housing 54 may encompass the ends of the legs of more than one heating element (e.g., two or three), but is preferred to maximize the cooling capacity by maximizing the total housing surface area for a given number of heating elements. Thus, a single heating element per housing is optimal. But the advantages of the present invention can be partially attained even with substantial numbers of heating elements within each housing, provided that a minor portion of the total number of heating elements is contained within each housing. While it is preferred to maximize the heat transfer surface area of each housing, it is also desirable to make each housing relatively compact so as to permit free circulation of air among the housings.

Figure 5:
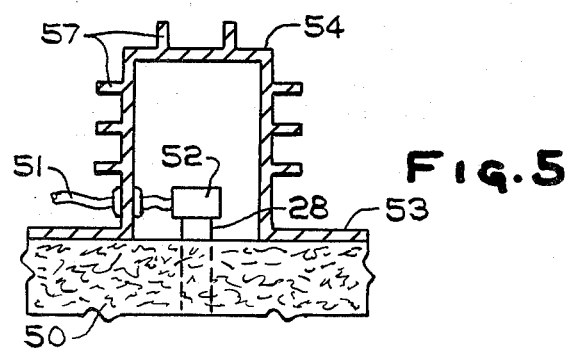
FIG. 5 is a cross-sectional view of an embodiment of a housing for electrical heater connections having cooling fins.

By thus minimizing the size of housings 54, the bulk of the enclosure above the float chamber roof is reduced, thereby providing freer access for maintenance and revision. Furthermore, by employing a large number of relatively small housings, cooling of the electrical connections is facilitated since air is free to circulate among the housings, and the housings present a large heat transfer area compared to the prior art plenum. Additional enhancement of heat transfer from the housings 54 may be achieved by providing cooling fins 57 on the exterior of the housings as shown in FIG. 5. Additionally, cooling may be improved by forced circulation of air about the housings, such as by fan means 58 as shown in FIG. 1a. Also, water-cooled heat exchange means may be provided on or near the housings for even greater cooling capacity.

A specific preferred embodiment has been described in detail for the sake of illustrating the invention and for disclosing the best mode, but it should be understood that other variations and modifications, as are known to those of skill in the art, may be resorted to without departing from the scope of the invention as defined by the claims which follow.

What is claimed is:

1. An apparatus for producing flat glass by the float process comprising an elongated enclosure adapted to hold a pool of molten metal, means for delivering a stream of molten glass into the enclosure onto the molten metal, means for drawing the glass along the length of the enclosure and for withdrawing the glass from the enclosure as a formed ribbon, a plurality of electrical heating elements in the enclosure having legs extending to the exterior of the enclosure, electrical connection means connecting the exterior portion of the heating element legs to a source of electrical power, a substantially gas-tight casing extending over the exterior of the enclosure, the casing having openings through which the heating element legs pass, and a plurality of spaced-apart housings on the exterior of the casing, each housing enclosing the exterior leg portion of a minor number of the heating elements and the openings in the casing.

2. The apparatus of claim 1 wherein each housing encloses the exterior leg portion of no more than one of the heating elements.

3. The apparatus of claim 1 wherein each of the housings cooperates with the casing to form a gas-tight enclosure around the respective exterior heating element leg portions.

4. The apparatus of claim 1 or 3 wherein the electrical connection means include bus bars exterior to the housings, and electrical conductor leads extending through the housings from the bus bars to the exterior leg portions.

5. The apparatus of claim 1 wherein at least some of the housings have associated therewith means to circulate air around the exterior of the housings.

6. The apparatus of claim 1 or 5 wherein at least some of the housings are provided with cooling fins.

7. The apparatus of claim 3 wherein the interior of the enclosure is in communication with a source of non-oxidizing atmosphere and the interiors of the housings are in gaseous communication with the interior of the enclosure.

8. The apparatus of claim 3 wherein the gas-tight casing extends over the top of the enclosure in contact with a substantial portion of the top of the enclosure.

9. The apparatus of claim 8 wherein the casing is comprised of metal sheeting.

10. The apparatus of claim 8 wherein the casing is comprised of a glaze.

11. An apparatus for producing flat glass by the float process comprising an elongated enclosure adapted to hold a pool of molten metal, means for delivering a stream of molten glass into the enclosure onto the molten metal, means for drawing the glass along the length of the enclosure and for withdrawing the glass from the enclosure as a formed ribbon, and a glaze coating applied to the exterior suface of the top of the enclosure rendering the top substantially gas-tight.

12. The apparatus of claim 11 wherein the top of the enclosure includes a rigid refractory structure supporting a layer of nonrigid insulation, and the glaze coating is applied over the insulation layer.

* * * * *